United States Patent
Ott et al.

(10) Patent No.: US 9,830,830 B2
(45) Date of Patent: *Nov. 28, 2017

(54) STIMULUS RECOGNITION TRAINING AND DETECTION METHODS

(71) Applicant: SMART INFORMATION FLOW TECHNOLOGIES, LLC, Minneapolis, MN (US)

(72) Inventors: Tammy Elizabeth Ott, Saint Paul, MN (US); Harry Bromberg Funk, Minneapolis, MN (US); Jesse Albert Hostetler, Corvallis, OR (US)

(73) Assignee: SMART INFORMATION FLOW TECHNOLOGIES, LLC, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/205,923

(22) Filed: Jul. 8, 2016

(65) Prior Publication Data

US 2016/0321933 A1 Nov. 3, 2016

Related U.S. Application Data

(62) Division of application No. 13/676,904, filed on Nov. 14, 2012, now Pat. No. 9,390,627.

(51) Int. Cl.
*G09B 5/02* (2006.01)
*G09B 5/00* (2006.01)
*G09B 19/00* (2006.01)

(52) U.S. Cl.
CPC ............... *G09B 5/02* (2013.01); *G09B 5/00* (2013.01); *G09B 19/00* (2013.01)

(58) Field of Classification Search
CPC ........................................................ G09B 5/02
(Continued)

(56) References Cited

U.S. PATENT DOCUMENTS 4,699,153 A 10/1987 Shevrin et al.
6,057,846 A 5/2000 Sever, Jr.
(Continued)

OTHER PUBLICATIONS

Tammy Ott, Vanessa Vakili, Harry Funk, Learning and Identification of Facial Images without Awareness, Cognitive Neuroscience, Annual Meeting, Jan. 2010.*
(Continued)

*Primary Examiner* — Thomas Hong
(74) *Attorney, Agent, or Firm* — JoAnn M. Seaton; Griffiths & Seaton, PLLC

(57) ABSTRACT

A method of conditioning a trainee to identify an object and monitoring the trainee to determine when the trainee subconsciously identifies the object is provided. The method includes using a processor to select a visceral response-evoking image for evoking the desired trainee response corresponding with the object, attaching a sensor to the trainee for detecting trainee biological responses, and providing instructions to display a stimulus image depicting the object for a first duration that is below conscious awareness of the trainee. The method includes providing instructions to display the visceral response-evoking image after the display of the stimulus image and for a duration below conscious awareness of the trainee to link the desired trainee response to the object in a mind of the trainee, and detecting trainee recognition of one of the one or more objects based on the biological response data linked to the desired trainee response.

19 Claims, 8 Drawing Sheets

(58) Field of Classification Search
USPC .................................................... 434/219
See application file for complete search history.

(56) References Cited

U.S. PATENT DOCUMENTS

| | | | |
|---|---|---|---|
| 8,221,127 B1* | 7/2012 | Poulsen | G09B 19/00 434/236 |
| 2009/0018897 A1* | 1/2009 | Breiter | G06Q 30/0203 705/7.32 |
| 2010/0185113 A1* | 7/2010 | Peot | A61B 5/7267 600/544 |
| 2011/0027764 A1 | 2/2011 | Bianchi-Demicheli et al. | |
| 2015/0086951 A1* | 3/2015 | Bulut | G06F 19/3481 434/236 |

OTHER PUBLICATIONS

Bargh, J. A. & Chartrand, T. L., (2000). The mind in the middle: A practical guide to priming and automaticity research, in Handbook of research methods in social and personality psychology, H. T. Reis, Ed. and C. M. Judd, Ed. New York: Cambridge University Press, pp. 253-285.

Bechara, A., Damasio, H., Tranel, D. and Damasio, A.R. (2005). The Iowa Gambling Task and the somatic marker hypothesis: some questions and answers. TRENDS in Cognitive Sciences vol. 9 No. 4.

Bradley, M. M., Codispoti, M., Cuthbert, B. N. & Lang, P. J. (2001). Emotion and motivation I: Defensive and appetitive reactions in picture processing, Emotion, 1, 276-298.

De Houwer, J., Thomas, S., & Baeyens, F. (2001). Associative learning of likes and dislikes: A review of 25 years of research on human evaluative conditioning. Psychological Bulletin, 127, 853-869.

Dijksterhuis, A., Aarts, H. & Smith, P. K. (2005). The power of the subliminal: On subliminal persuasion and other potential applications. In Ran R. Hassin, James S. Uleman, & John A. Bargh (Eds.). The new unconscious, pp. 77-106. New York: Oxford University Press.

Knight, D. C., Nguyen, H. T. & Bandettini, P. A. (2006). The role of awareness in delay and trace fear conditioning in humans. Cognitive, Affective, & Behavioral Neuroscience, 6, 157-162.

Mogg, K., and Bradley, B. P. (1999). Orienting of attention to threatening facial expressions presented under conditions of restricted awareness, Cognition and Emotion, 13, 713-740.

Ohman, A., and Soares, J. J. F., (1998) "Emotional conditioning to masked stimuli: expectancies for aversive outcomes following nonrecognized fear-relevant stimuli," Journal of Experimental Psychology: General, vol. 127, pp. 69-82.

Olson, M. A. & Fazio, R. H. (2006). Reducing automatically activated racial prejudice through implicit evaluative ,conditioning. Personality and Social Psychology Bulletin, 32, 421-433.

Seamon, J. G., Marsh, R. L. & Brody, N. (1984). Critical importance of exposure duration for affective discrimination of stimuli that are not recognized. Journal of Experimental Psychology: Learning, Memory, and Cognition, 10, 465-469.

Tranel, D. & Damasio, A. R. (1988). Non-conscious face recognition in patients with face agnosia. Behavioral Brain Research, 30, 235-249.

Ott, Tammy, et al., "Learning and Identification of Facial Images without Awareness" poster presented at the Cognitive Neuroscience Society 2010 Annual Meeting, 2010 (7 pages).

* cited by examiner

STIMULUS RECOGNITION TRAINING AND DETECTION METHODS

CROSS-REFERENCE TO RELATED APPLICATION

This application is a divisional application of and claims priority to U.S. patent application Ser. No. 13/676,904, filed Nov. 14, 2012, which is incorporated herein by reference.

STATEMENT REGARDING FEDERALLY SPONSORED RESEARCH OR DEVELOPMENT

This invention was made with government support under contract number W31P4Q-09-C-0222 awarded by the Defense Advanced Research Projects Agency (Department of Defense). The government has certain rights in the invention.

BACKGROUND OF THE INVENTION

Security operations oftentimes involve the completion of multiple and/or highly complex tasks. For example, some operations may require the simultaneous performance of more than one task. Other operations involve the performance of a task using a previously acquired skill and building on the skill for successful completion of a subsequent task. When performing the operations, an operator typically use portions of the brain that govern conscious thought to process information to carry out a task or to make decisions on whether to act. The unconscious mind of the operator is not accessed.

BRIEF SUMMARY OF THE INVENTION

One embodiment of the invention relates to a system for conditioning a trainee to recognize one or more objects or, e.g., persons. Other embodiments including other systems, methods, and products are also disclosed.

In one embodiment, by way of example only, a method is provided for conditioning a trainee to identify an object and monitoring the trainee to determine when the trainee subconsciously identifies one of one or more objects previously associated with a desired trainee response. The method includes using a processor to select a visceral response-evoking image for evoking the desired trainee response, wherein the desired trainee response is selected to correspond with the object, and the visceral response-evoking image is selected from a database storing available visceral response-evoking images. The method also includes providing instructions to an electronic device to display a stimulus image depicting the object, wherein the instructions to display the stimulus image are to display the stimulus image within view of a trainee for a first duration that is below conscious awareness of the trainee. The method also includes providing instructions to an electronic device to display the visceral response-evoking image within view of the trainee after the display of the stimulus image and to display the visceral response-evoking image for a second duration that is below conscious awareness of the trainee in an attempt to link the desired trainee response to the object in a mind of the trainee in a manner characterized by an absence of conscious awareness of the link by the trainee.

In one embodiment, the above-described method additionally or alternatively includes receiving biological response data of the trainee while the trainee is performing a task, and comparing the biological response data of the trainee to biological responses linked to different ones of a plurality of trainee responses, the plurality of trainee responses including the desired trainee response. The method further includes detecting trainee recognition of one of the one or more objects previously associated with the desired trainee response based, in part, on the biological response data being linked to the desired trainee response included with the plurality of trainee responses. The desired trainee response is below the conscious awareness of the trainee. Other embodiments, methods, systems, etc. are also described herein.

BRIEF DESCRIPTION OF THE DRAWINGS

Embodiments of the invention will be described with respect to the figures, in which like reference numerals denote like elements, and in which.

DETAILED DESCRIPTION

Figure 1:
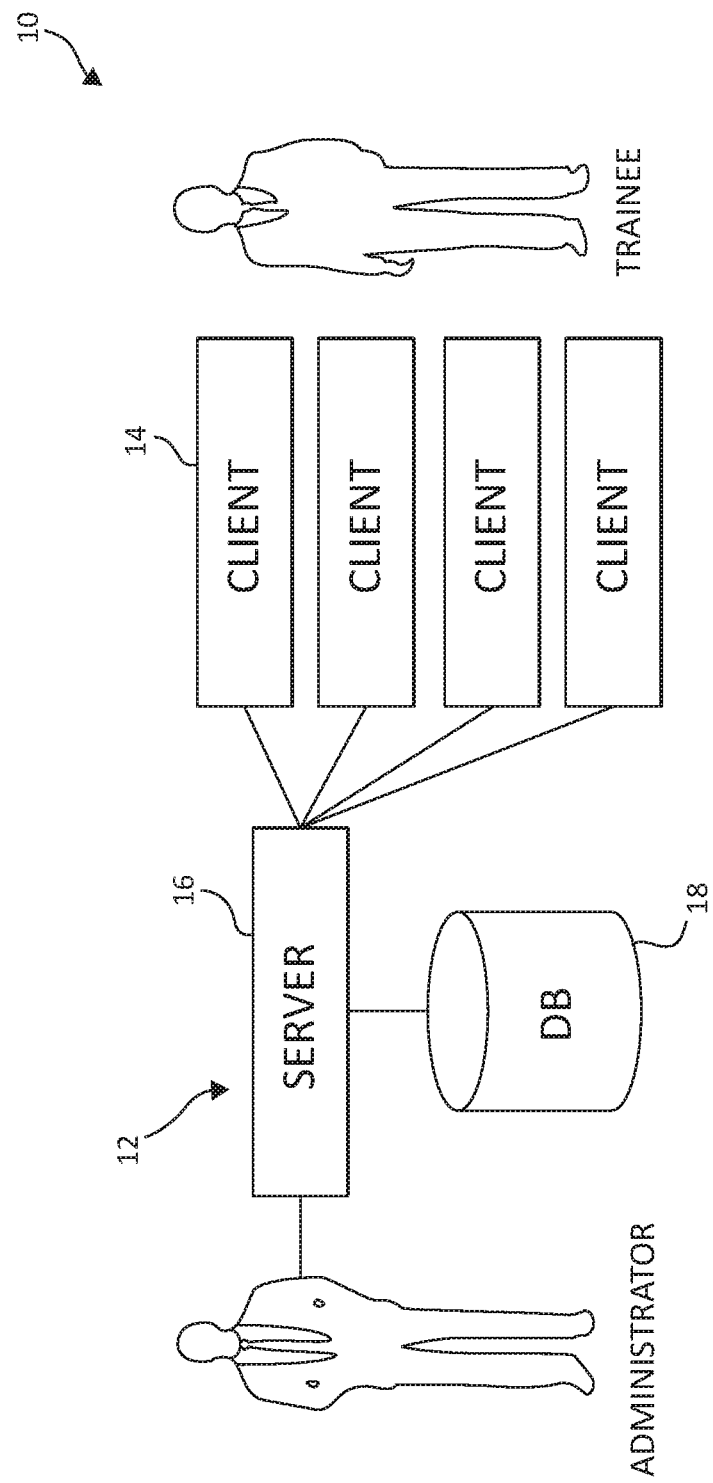
FIG. 1 is a block diagram of a system for enhancing trainee object or stimulus learning and recognition, according to one embodiment of the invention.

The following detailed description should be read with reference to the drawings, in which like elements in different drawings are numbered in like fashion. The drawings depict selected embodiments and are not intended to limit the scope of the invention. Those skilled in the art will recognize that many of the examples provided may have suitable alternatives that could be utilized with out departing from the spirit of the invention.

Learning new information can demand a great deal of time and attention. As a result, absorbing new information may be challenging. Improved systems and methods are now provided for training a person (also referred to as "trainee") to learn new information while requiring extremely low demands on attention and cognitive processes. In one embodiment, a method includes priming the trainee by allowing the trainee to view a target image representing a new object or stimulus (i.e., the new information). The trainee views the target image and a separate, visceral response-evoking image, each for a duration that is below conscious awareness. Pairing the target image with visceral response-evoking images, either positive or negative emotion-evoking images, encourages the trainee's mind to form a link between the two images. In particular, if the target image is paired with a positive or negative emotion-evoking image, the trainee's mind associates the target image with a positive or negative emotion.

In one embodiment, during priming, the trainee's biological response data is monitored. More particularly, biological response data from viewing the target image and the visceral response-evoking image are sensed and subsequently stored in a database. Biological response data from repeated exposures to the target image and visceral response-evoking images are used to create a trainee's historical biological response record. When the target image or the stimulus is reintroduced to the trainee after priming, a real-time biological response data is sensed and, in one example, compared to data in the trainee's historical biological response record. Recognition of the stimulus is detected when the real-time biological response data is substantially similar to or otherwise within predefined tolerances or ranges of (e.g., within 5% of) the data in the trainee's historical biological response record. In one embodiment, in addition to or as an alternative to collecting historical biological responses in a database and comparing real-time biological response data thereto, stimulus recognition by a trainee is detected when a spike or other substantially significant change is identified in the real-time biological responses collected over a series of biological responses.

By presenting the target and visceral response-evoking images to the trainee for durations that are below conscious awareness, the trainee is unaware that he/she is viewing, and hence, learning, the images. In particular, the trainee performs an operation unrelated to the learning using one part of his/her brain that allows for conscious awareness and while simultaneously accessing another portion of his/her brain (allowing for conditioning without awareness) that is not otherwise being used. As such, the trainee is able to perform the operation without consciously or noticeably dividing his/her attention between an immediate task and learning stimuli. Additionally, pairing target images with other non-target images (e.g., visceral response-evoking images) conditions the trainee to physically react to the target image (or stimulus) when the image is reintroduced into view.

The above-mentioned systems and methods have a variety of practical uses. For instance, the systems and methods can be employed in a security context to train a security guard, baggage screener, or transportation security agent to recognize a nefarious item, person, place, or the like. In another example, the systems and methods are implemented in a medical setting in which the trainee is a doctor, nurse, or other medical worker. In still other examples, the systems and methods are used by the military to train soldiers or civilians. Although the systems and methods will be described below as part of a security system, it will be appreciated that still other various uses are also contemplated.

FIG. 1 is a block diagram of a system 10 for enhancing trainee object or stimulus learning and recognition. System 10 includes a main operator site 12 accessible by one or more administrators and one or more client sites 14 connected to one or more trainees. Main operator site 12 is located at a designated main control site. Each client site 14 is located remote from main operator site 12 and is coupled through a network to main operator site 12. The network is a local area network, wide area network, wireless network, cellular network, or another type of network suitable for providing communications capabilities between main operator site 12 and client site 14.

Main operator site 12 allows the administrator to control stimuli or target images on which trainees are to be trained, to monitor trainees at client sites 14, and/or to detect recognition of stimuli by the trainees. In an embodiment, main operator site 12 includes a processor or server 16 and a database 18.

Server 16 provides the administrator with a user interface for interacting with system 10 and communicates with database 18 and client sites 14. In an embodiment, server 16 is a computer system or other hardware. In any case, server 16 provides a training and detection application operable to employ stimuli and non-stimuli images to condition the trainee to recognize the stimuli and to detect trainee recognition of the stimuli or objects. Additionally, server 16 allows the administrator to perform administrative tasks, such as uploading new stimuli and non-stimuli images, assigning stimuli on which to be trained, setting the timing and sequencing of a training schedule, and removing or grouping stimuli and non-stimuli images for training. Server 16 also allows the administrator to audit training data for determining whether the trainees are performing adequately during conditioning and validation trials, and to review information related to each trainee.

Server 16 retrieves data from database 18, which stores the stimuli and non-stimuli images, information related each trainee, and, in one embodiment, receives and stores biological response data from trainees connected to system 10. Database 18 is located in a memory device on main operator site 12 or, alternatively, in virtual memory located remote from, but still accessible by, main operator site 12.

Each client site 14 is operable to run the training and detection application locally and/or to collect biological response data from the trainees during conditioning and non-conditioning exercises. Client sites 14 are operable to execute one or more computer applications and/or to display one or more series of images simultaneously with and unrelated to the stimuli and non-stimuli images provided by the training and detection application. In one embodiment, client sites 14 both support a primary trainee task fully appreciated by the trainee while simultaneously presenting training images to the trainee in a manner not consciously detected by the trainee.

Figure 2:
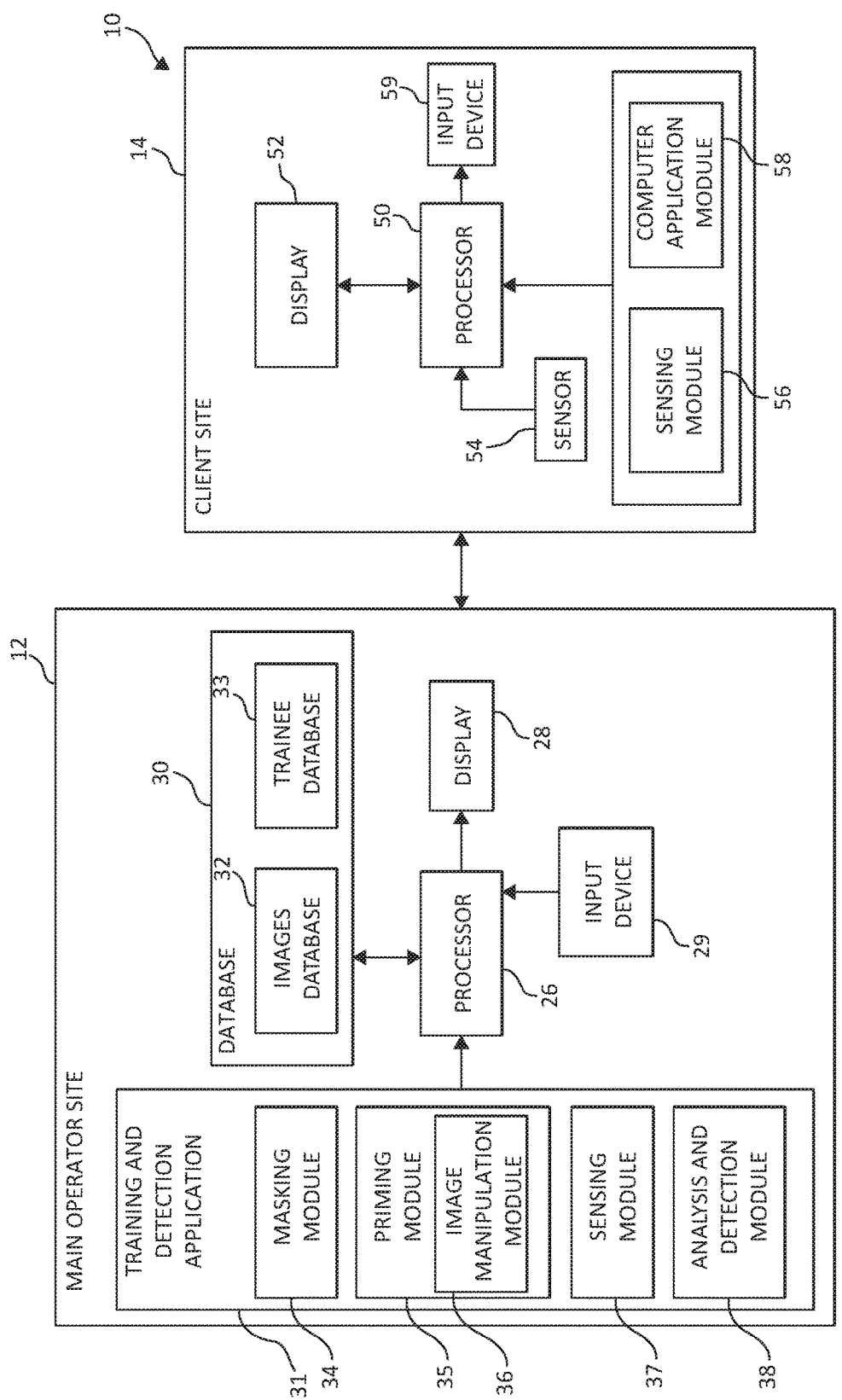
FIG. 2 is a block diagram detailing a system including a main operator site and a client site of the system of FIG. 1, according to one embodiment of the invention.

FIG. 2 is a block diagram detailing portions of main operator site 12 and client site 14. Generally, main operator site 12 includes a processor 26, a display 28, an input device 29, a database 30, and training and detection application 31. Processor 26 communicates with display 28 and is operable to execute instructions from training and detection application 31. Display 28 provides a graphical user interface to the administrator. Input device 29 is operable to allow the administrator to input information to system 10. Input device 29 includes one or more of a keyboard, a mouse, a joystick, a touchpad, or another device configured to allow the administrator to communicate with system 10.

In one example, database 30 is similar to database 18 described above. Additionally, in one embodiment, database 30 includes an images database 32 and a trainee database 33. Images database 32 stores stimuli and non-stimuli images, and trainee database 33 stores individual trainee records. Each individual trainee record includes trainee information, for example, identifying information, personality traits, work history, data related to stimuli training such as biological response data, data related to past object recognition events, and other information related to a trainee. In one embodiment, trainee database 33 is eliminated and/or does not include historical biological response data for the trainee other than very recent response data for comparison for spikes or other changes in readings being monitored.

In one example, images database 32 is created when, the administrator uploads one or more stimulus images in an unaltered state for storage in images database 32 or in temporary memory. Stimuli images include, but are not limited to, pictures of wanted persons, such as bad actors including known or suspected terrorists or criminals, and pictures of weapons, devices, or other items security or intelligence personnel would have a need to recognize. In one embodiment, each unaltered stimulus image is saved in a recognizable format, such as an importable/exportable bit image in .BMP, .TIFF, .PNG, .PSD, .TGA, .JPEG, or another format.

As noted above, training and detection application 31 is operable to condition the trainee to recognize stimuli without conscious awareness. To do so, training and detection application 31 includes a masking module 34, a priming module 35, a sensing module 37, and an analysis and detection module 38. Masking module 34 is operable with processor 26 and images database 32 to jumble one or more of the stimuli images and/or non-stimuli images to form jumbled images 61 (see FIG. 4). Jumbling the images helps to hide the stimuli and/or non-stimuli images from conscious awareness and is used to ensure decay of the stimuli images from iconic memory while allowing the stimuli and non-stimuli images to remain within the trainee's subconscious.

Figure 3:
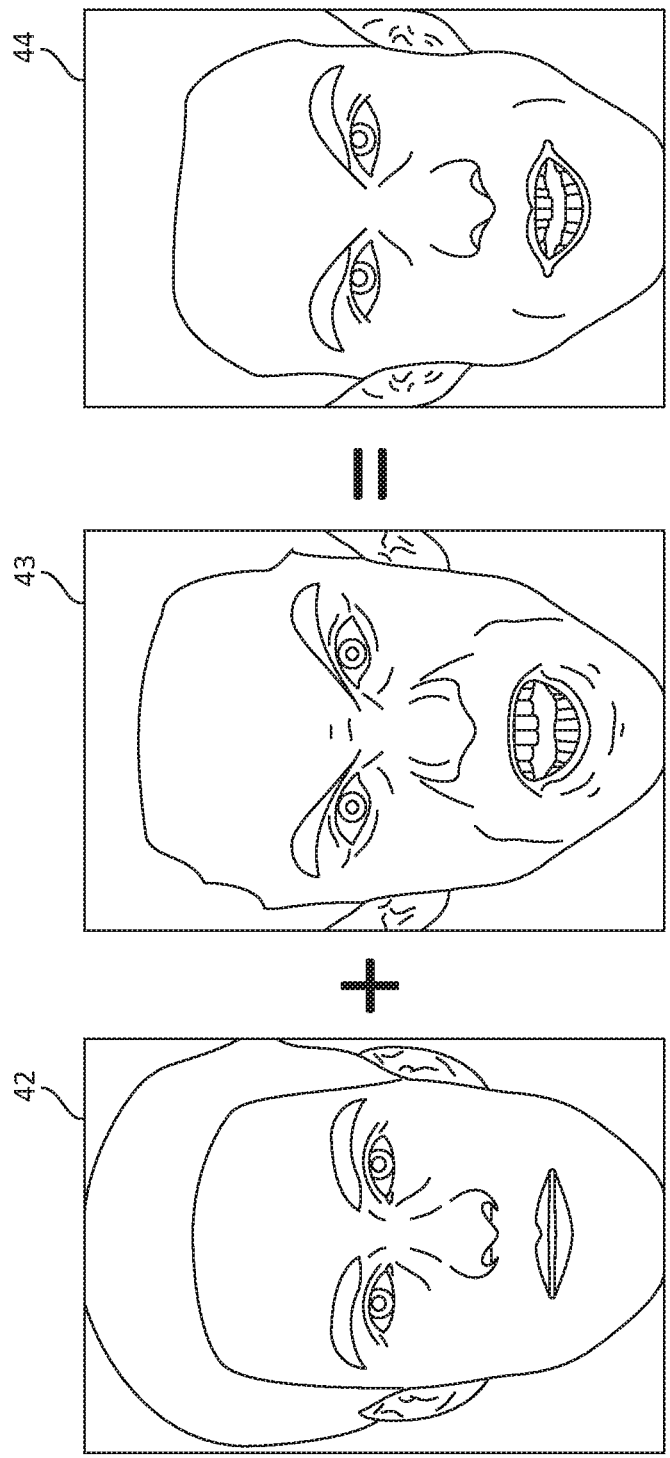
FIG. 3 is a depiction of how an original stimulus image is modified to an altered stimulus image, according to one embodiment of the present invention.

In one example, training and detection application 31 additionally includes image manipulation module 36 to modify selected features of one or more of the original images while in other examples the stimulus images are substantially unaltered. In an example, the stimulus includes an image of a person, and the administrator has a desire to alter one or more facial features of the image of the person. The administrator employs image manipulation module 36 to manipulate facial features exhibiting a neutral or non-angry appearance into features displaying a different emotional state. In some cases, a trainee is more apt to learn a facial image when the facial image has an angry appearance. Thus, image manipulation module 36 may modify an original neutral facial image to one having an angry appearance. For example, as illustrated in FIG. 3, a happy or neutral original facial image 42 is altered by angling eyebrows toward the bridge of the person's nose, widening or flaring the person's nostrils, narrowing the person's eyes, and/or adding other subtle known modifications (exaggerated in image 43). FIG. 3 shows an original facial image 42 and a resulting new, angrified image 44 created by image manipulation module 36. In another example, the non-angry facial features are altered by image manipulation module 36 so that the person exhibits another non-angry appearance, such as a crazed, sad, remorseful, coy, joyful, elated, or happy. In still other embodiments, facial features in the image of the person are exaggerated by image manipulation module 36 calling attention to the more pronounced features. After the selected original facial images 42 are transformed into new images 44, the new images 44 are stored as new files in images database 32. In one embodiment, original facial images 42 are saved directly to images database 32 without any or at least without substantial manipulation or other alteration.

Priming module 35 is operable with processor 26 and client site 14 to display stimuli images at client sites 14 in order to condition trainees to recognize stimuli in a manner that is below conscious awareness. In one embodiment, priming module 35 is operable to display stimuli images, which can include angry facial images 44, followed by non-stimuli images 46 (as depicted in a priming sequence 60 illustrated in FIG. 4). Each of stimuli and non-stimuli images 44 and 46 is displayed for a duration that is below conscious awareness.

Figure 4:
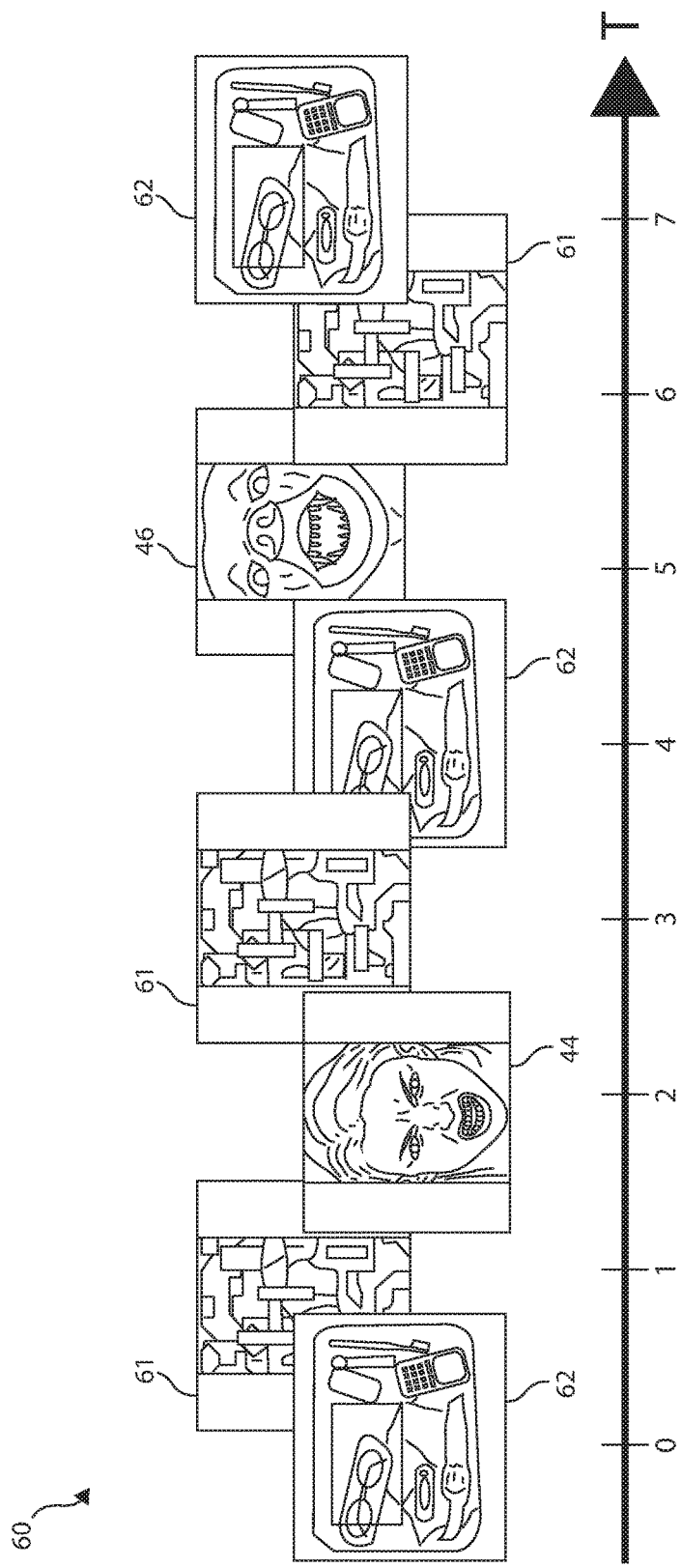
FIG. 4 is a schematic illustration of a priming sequence for use in enhancing trainee object or stimulus learning and recognition, according to one embodiment of the invention.

Non-stimuli images 46 generally include memorable images that are not stimuli images 44. In one embodiment, non-stimuli images 46 include visceral response-evoking images that evoke a desired, automatic biological response from a trainee when viewed. Examples of such visceral response-evoking images includes those of vicious or attacking animals (as shown in FIG. 4), extreme negative images such as war crime images, images depicting crimes against humanity or animals, sexually arousing images, electric shocks, or images of other heinous acts that evoke anger, fear, or other strong negative feelings. In another example, the visceral response-evoking images additionally or alternatively are selected to evoke positive feelings.

Priming module 35 includes a component operable to allow the administrator to customize the display of stimuli and non-stimuli images to each trainee. As will be appreciated, each individual trainee may have a different response to the types of images that evoke a visceral response. Thus, priming module 35 includes a component for the administrator to evaluate a trainee's particular traits and to identify and select visceral response-evoking images from images database 32 that elicit the greatest response from the trainee. The priming module 35 further allows the administrator to assign those identified images with the trainee's record for use with the display of stimuli images.

The component of priming module 35 also allows the administrator to set the length of time the trainee is exposed to stimuli and non-stimuli images. As briefly mentioned above, trainees are exposed to stimuli images 44 followed by non-stimuli images 46 for periods of time that are below that of conscious awareness. In this regard, priming module 35 can be set to flash images 44 and 46 at client site 14 for very short periods, such as for a few milliseconds. In one example, each image 44 and 46 is flashed for a duration of between about 5 milliseconds and about 25 milliseconds. In other examples, the duration is longer or shorter than the aforementioned range.

The priming module 35 also allows the administrator to set a sequence in which to display images 44 and 46. For example, the administrator can set the priming module 35 to display of one or more stimuli images 44 immediately followed by the display of one or more non-stimuli images 46 (e.g., no intervening images are shown). Alternatively, the sequence includes displaying a single stimulus image 44 followed by a single non-stimulus image 46. In another alternative, the sequence includes more than one stimulus image 44 followed by a single non-stimulus image 46, or vice versa.

To further ensure priming occurs below conscious awareness, priming module 35 is operable to display stimuli and non-stimuli images 44 and 46 while other computer applications are running at client site 14. In one embodiment, priming module 35 displays stimuli images 44 and visceral response images 46 as intervening images while the trainee focuses attention on a screen to perform a task based on application images 62 unrelated to priming. In an example, the trainee engages in viewing a series of application images 62 on a screen (e.g., a training video, a movie, a computer application, baggage or body images, X-rays or other images of persons in various contexts (such as travelers, patients, visitors of secure sites and the like)) or otherwise focuses on operating a computer application (e.g., performing research on the Internet or a gaming activity). As the trainee views the screen, images 44 and 46 are flashed on the screen exposing the trainee to images 44 and 46 in a manner consciously unbeknownst to the trainee while the trainee consciously views application images 62.

In one example, priming module 35 includes a masking module 34 configured to provide additional assurances that the priming process remains below the conscious awareness of the trainee. In one embodiment, masking module 34 is configured to provide masked or jumbled images 61 to be interposed on the screen being viewed by the trainee along with screen images 44 and 46. Use of jumbled images 61 intermixed with images 44 and 46, for example, immediately before and/or following stimuli images 44, is employed to ensure decay of stimuli images 44 from the conscious memory of the trainee while not degrading the visceral feeling attached to the corresponding non-stimuli images 46 from the unconscious trainee memory.

FIG. 4 is a schematic illustration of an example priming sequence 60 for use in enhancing trainee object or stimulus learning and recognition. Priming sequence 60 occurs over a period of time. At t=0, a series of computer application images 62 are displayed. Next, at least one frame of jumbled images 61 are displayed at t=1. Although one frame of each of images 61 and 62 are illustrated, it should be understood that fewer or more can be included. Each of those images 61 and 62 are displayed for a duration that is above conscious awareness of the trainee. In one embodiment, images 61 are presented at durations that are below conscious awareness, but may reach conscious awareness because such images can remain in iconic memory if image 62 is not sufficient to erase them from iconic memory; in other embodiments, images 61 do not reach conscious awareness. At t=2, stimulus image 44 is displayed for a duration that is below conscious awareness of the trainee. Next, at t=3, one or more frames of image 61 is displayed and at t=4 image 62 is displayed. Subsequently at t=5, a non-stimulus 46 is displayed, followed by the display of one or more frames of images 61 at t=6 and 62 at t=7. Other suitable series of image displays including images 44, 46, and 62 and, in one embodiment, images 61 will be apparent to those of skill in the art reading the present application.

As briefly noted above, biological response data of the trainee is collected during training and resting periods. Sensing module 37 receives biological response data from each client site 14. Biological response data includes one or more biological data measurements, such as skin conductance response data (i.e., galvanic skin response data) pulse data, pupil dilation measurements, brain wave data (measured by an electroencephalogram or by infrared activity brain sensors), heart rate data, or other biological response data having a relatively consistent reading during a resting period. A resting period occurs when no discrete event is being presented to the trainee. The resting period includes periods of rest or period of performing a task entirely unrelated to training, e.g., while images 62 are viewed without substantially interruption by images 44 and/or 46. In other embodiments, sensing module 37 is operable to aggregate several different types of biological data measurements from one trainee and to send the data to analysis and detection module 38. Biological response data are stored in trainee database 33.

Figure 5:
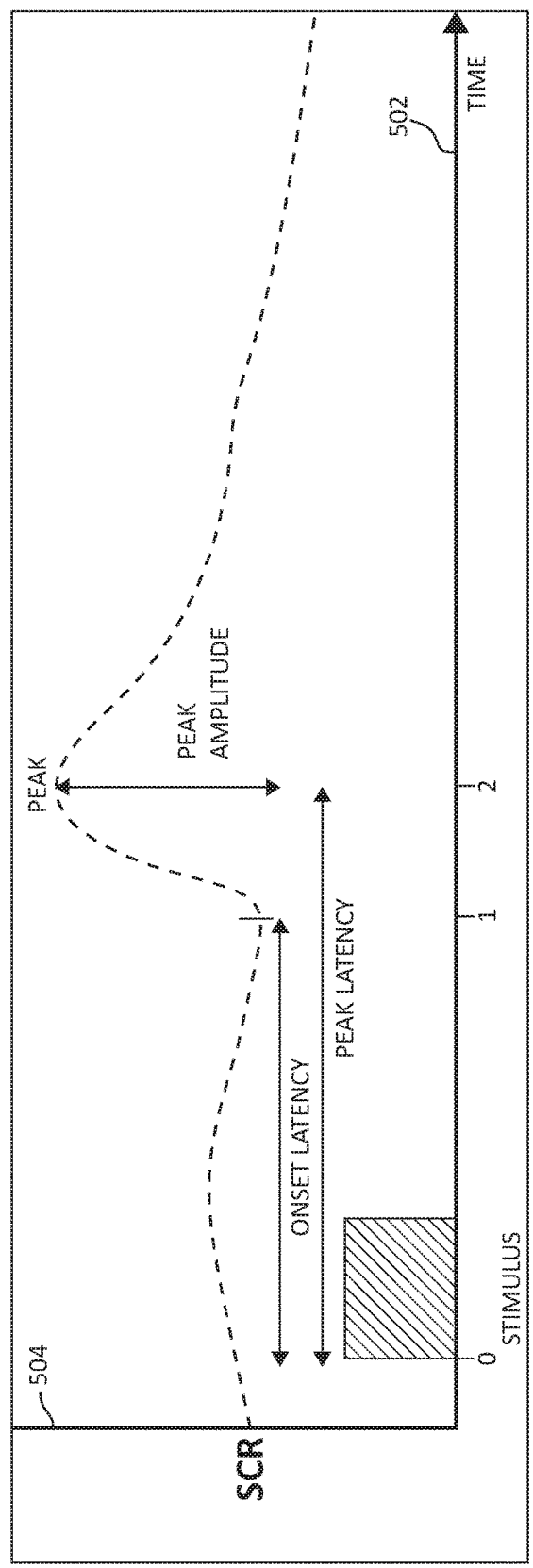
FIG. 5 is a graphical representation of a response of a trainee to an exposure of a stimulus, according to one embodiment of the present invention.

Analysis and detection module 38 is operable to analyze the biological response data received by sensing module 37 for the detection of a recognition event. In one embodiment, analysis and detection module 38 receives skin conductance-related biological data collected by sensing module 37 during one or more resting periods to establish a baseline biological reading or baseline or tonic skin conductance level. During training (e.g., when skin conductance data from the trainee changes as the trainee observes images 44 and images 46), analysis and detection module 38 determines an onset latency period, a peak latency period, and a peak amplitude from each skin conductance data received from sensing module 37. In a graphical representation as illustrated in FIG. 5, over time (indicated on x-axis 502 from t=0 to t=2), biological response data is measured (indicated by y-axis 504). Baseline level is established at or before t=0. A stimulus is presented at t=0 followed by the onset latency period from t=0 to t=1. The onset latency period is a period of time from exposure to the stimulus image to an onset of a response to the stimulus image. At t=1, the biological response begins an ascent to a peak at t=2, where a peak amplitude can be measured. The peak amplitude is a difference between a measurement at onset to peak. The peak latency period is a period of time from the onset of the response to the stimulus image to a measured peak of the response (e.g., from t=0 to t=2).

Over time and after multiple exposures to images 44 and 46, analysis and detection module 38 develops a historical biological response record for each trainee based, in part, on the collected biological response data. Historical biological response records for each trainee are stored in trainee database 33. In an embodiment, analysis and detection module 38 later uses the historical biological response data from trainee database 33 to detect stimuli recognition without the trainee's conscious awareness. In one embodiment, historical biological response records are not stored for each trainee other than a sufficient sampling of collected biological response data to recognize peaks or other telling changes in the collected data that may indicate recognition of stimuli.

Training and detection application operates with client site 14 to condition trainee to recognize the stimulus and to detect a recognition event. With continued reference to FIG. 2, client site 14 includes a processor 50, a display 52, a sensor 54, a sensing module 56, and, optionally, a computer application module 58 and/or input device 59. Processor 50 is operable to execute instructions from main operator site 12 and from computer application module 58, if included, to display images on display 52. For example, priming module 35, in operation with processor 50 and display 52, displays each image 44 and 46 on display 52 for the trainee to observe for a duration that is below conscious awareness. In one embodiment, display 52 displays a seemingly blank screen or screensaver while simultaneously flashing images 44 and 46.

Alternatively, computer application module 58, in operation with processor 50 and display 52, runs one or more non-training and detection applications for trainee to engage with, while operating concurrently with priming module 35 to display images 44 and 46. In an example, computer application module 58 is operable to run Internet applications, content access software, media players, word processing programs, or other types of office suite software, engineering software, simulation software, or any other type of software designed to help the trainee complete tasks. In another example, client site 14 is employed for airport security purposes, and computer application module 58 is operable with processor 50 and display 52 to display baggage or passenger images, while priming module 35 is operable via processor 50 and display 52 to flash images 44 and 46 in between the baggage and/or passenger images.

Sensor 54 operates in conjunction with sensing module 56 to sense biological response data from the trainee at client site 14 and attaches to or resides in the proximity of the trainee. Suitable sensors 54 include, but are not limited to devices including two pre-wired Ag/AgCl electrodes each with a housing filled with a conductive gel for attachment to a medial phalanx of the index and middle fingers of a non-dominant hand each having a disposable adhesive collar disposed thereover for measuring skin conductance, a pulse transducer for attachment to a ring finger of the non-dominant hand for measuring heart rate, a pupil measurement device, or another device (e.g., more readily portable devices) configured to detect biological response data of the trainee. As sensor 54 senses the biological response of the trainee, sensing module 56 is operable with processor 50 to collect the biological data and to send the data to main operator site 12.

Figure 6:
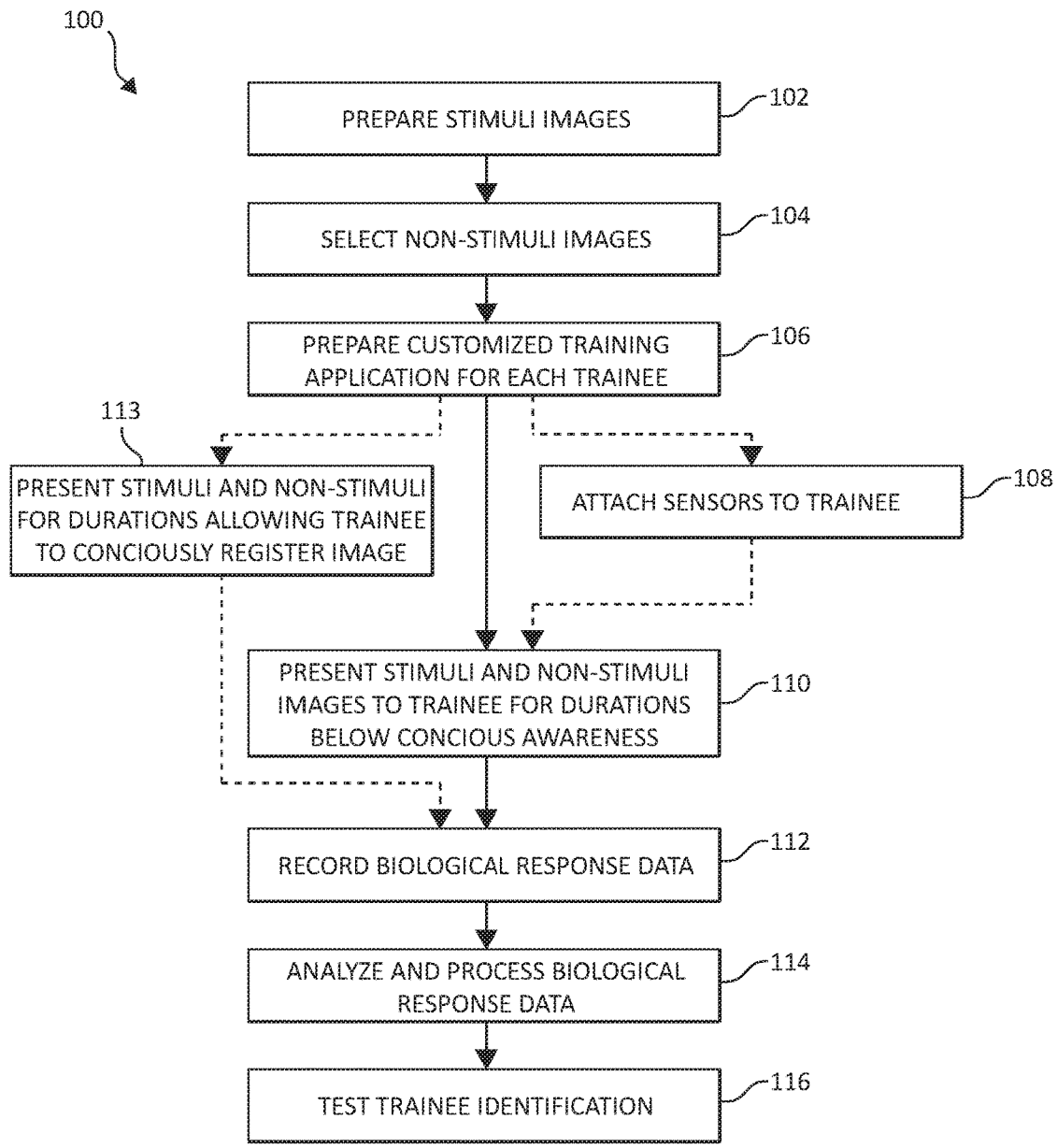
FIG. 6 is a flow diagram of a method of for enhancing trainee object or stimulus learning and recognition, according to one embodiment of the present invention.

FIG. 6 is a flow diagram of a method 100 of conditioning a trainee to learn a stimulus, according to an embodiment. Method 100 begins at 102 with the preparation of one or more stimuli or target images to which the trainee will be exposed. In an embodiment, the stimulus or target image is used for conditioning a trainee to recognize a person and thus includes a frontal or side view of a facial image of the person. To prepare the target image, the administrator employs media, movie maker or another type of software to isolate the facial image of the person by zooming in on the person's face and/or removing non-facial portions of the image. As noted briefly above, the administrator may have a desire to alter the facial image. For example, the facial image may have a neutral original appearance, and the administrator may want to alter the facial image to exhibit an emotional appearance in order to increase trainee association of the facial image to an emotion. For example, additionally or alternatively, the facial image is further modified from a happy, sad, neutral, or angry appearance to another appearance. In this regard, the administrator uses morphing or animation software (as described above in conjunction with image manipulation module 36) to alter facial features of the facial image without altering an identity of the person. In an embodiment, if more than one target image is to be presented to the trainee, each facial image is modified accordingly. In any case, the target image is stored in an images database (e.g., images database 32).

Non-stimuli images are selected, at 104, to be presented along with the target image in future steps of method 100 (as will be described later). The non-stimuli images include, but are not limited to visceral response-evoking images that elicit an immediate, automatic, desired biological response when viewed by the trainee. Examples of visceral response-evoking images include those that cause one to feel threatened, such as those showing a vicious, attacking, or threatening animal (e.g., a grizzly bear, dog, lion, snake, wolf, shark, or other animal) oriented toward the trainee, a person poised in a lunging or attacking stance, or a person in a threatening situation (e.g., with a tarantula on his/her face or being attacked by an animal or person). The non-stimuli images are stored in the images database (e.g., images database 32) as available non-stimuli images.

Customized training and detection applications are prepared for each individual trainee at 106. In an example, the administrator selects particular non-stimuli images to be displayed to the trainee and to evoke a desired trainee response. Depending on individual characteristics of the trainees, each non-stimuli image may garner differing responses from individual trainees. To determine which non-stimuli image best elicits the correct response from the trainee, data relating to the trainee's individual personality traits and/or phobias are collected and stored in a database (e.g., trainee database 33) and used to improve trainability.

For example, personality traits such as the need to evaluate, anxiety, neuroticism, extroversion, and psychoticism affect trainability. In particular, those with a higher need to evaluate, higher anxiety level, higher neuroticism, those who are more extroverted, or those with a higher psychoticism level have been found to be easier to train than those with lower levels of the aforementioned traits.

The administrator can identify the trainee's personality traits and may select one or more non-stimuli images to accompany the stimuli images based on the personality traits. Thus, those visceral response-evoking images that are more negative than other images can be used to accompany images to be shown to trainees with lower levels of the aforementioned traits. In another example, images related to the particular trainee's phobias are used (e.g., if a particular trainee is known to be scared of spiders, use of photographs or other depictions of spiders as stimuli images would be likely to produce a larger and, therefore, more effective response).

In another example, the administrator refers to the trainee's historical biological response record to determine an optimal duration for image exposure and customizes the training and detection application to show images 44 and 46 to the trainee for the optimal duration. After the images are selected, the administrator provides input to the administrator site (e.g., administrator site 12) to instruct a client site (e.g., client site 14) to begin running the priming module.

To collect the trainee's historical biological response data, optionally, sensors are attached to the trainee at a client site (e.g., client site 14) for collecting skin response data (e.g., sensor 54) at 108. In an example, the trainee attaches electrodes to an index and a middle finger of the trainee's hand, and/or attaches a finger cuff to the trainee's ring finger. Additionally, the trainee may be engaged in an unrelated activity during which attention is to be paid to a display (e.g., display 52). For example, the trainee may be passively viewing a video, a movie, or a series of images. In another example, the trainee is actively participating in a screening activity, such as reviewing baggage x-rays and/or x-rays of airport, train, bus or other passengers or visitors of a building. In still another example, the trainee is surfing the Internet or engaging in a gaming activity.

The stimuli images and non-stimuli images are presented to the trainee for durations that are below conscious awareness at 110. While the trainee's attention is on display 52, images 44 and 46 are flashed on the screen. In an embodiment, stimulus image 44 is flashed on the screen for several milliseconds or another duration below conscious awareness followed by a several millisecond flash of non-stimulus image 46. Each of images 44 and 46 are flashed for about 5 milliseconds to 25 milliseconds. Alternatively, the trainee is exposed to images 44 and/or 46 for shorter or longer durations. Images 44 and 46 are shown immediately successively, in an embodiment. In another embodiment, a duration of about 5 millisecond to one second is included between showing of images 44 and 46. The display of the same images 44 and 46 may be repeated. For example, images 44 and/or 46 are presented to the trainee fifteen to twenty-five times each. In other embodiments, the trainee is exposed to images 44 and/or 46 more or fewer times than the aforementioned range.

According to an embodiment, more than one stimulus image 44 are to be learned. In such instance, each target image 44 is flashed, followed by non-stimulus image 46, for durations below conscious awareness. The duration of non-exposure between the showings of each set of images (i.e., one stimulus image 44 and one non-stimulus image 46) can be at predetermined or random intervals. For example, the duration between the sets are a few seconds to a few minutes. Each set of images are shown in a repetitive loop, in an embodiment. Thus, the sets are in a set order and shown in the same order. Alternatively, the sets of images are in no set order, but are shown repetitively at random. Over time and after multiple exposures to images 44 and 46, the trainees become conditioned to react to stimuli images 44 so that stimuli images 44 become conditioned stimuli images. In particular, the trainee's mind links the desired trainee response (elicited by the non-stimuli images) to the object in a manner characterized by an absence of conscious awareness of the link by the trainee.

Biological data relating to the trainee's response to the target images are recorded at 112. The sensor (e.g., sensor 54) attached to the trainee detects skin conductance responses (e.g., from the electrodes attached to the trainee's index and middle fingers) and/or pulse rate (e.g., from the finger cuff). Results are received by sensing module 56 at the client site (e.g., client site 14).

Returning to 106, in one embodiment, stimuli images and non-stimuli images are presented to the trainee for durations that allow the trainee to consciously register the images alternatively at 113. Conscious learning of the images is included to present a more accurate set of biological response data for historical biological response records. After conscious viewing of the images, biological data in response to the viewing is recorded at 112.

In any case, the results of the biological response data are processed and analyzed at 114. In particular, the biological response data is sent from client site 14 to the main site (e.g., site 12). In an embodiment, analysis and detection module 38 monitors and collects the trainee's biological response data recording the values for the onset and peak latencies and peak amplitudes for each response to each conditioned stimulus image. Repetitive exposure to each target image 44 allows analysis and detection module 38 to create a baseline biological reading or the historical biological data record for each trainee including average expected values for each onset and peak latencies and peak amplitudes. Hence, over time and as a result of exposures to the images 44 and 46, the baseline biological readings and/or the historical biological data record include a plurality of biological responses, each being linked to a desired trainee response.

Trainee identification of the conditioned stimuli images is then tested at 116. For example, a real-life object represented in the conditioned stimulus image may come into view of the trainee, e.g., a person shown in the stimuli image may cross paths with the trainee. In another example, the administrator provides an input to the system to display one of the conditioned stimuli images. In any case, exposure to the person or the image may elicit a biological response from the trainee.

Figure 7:
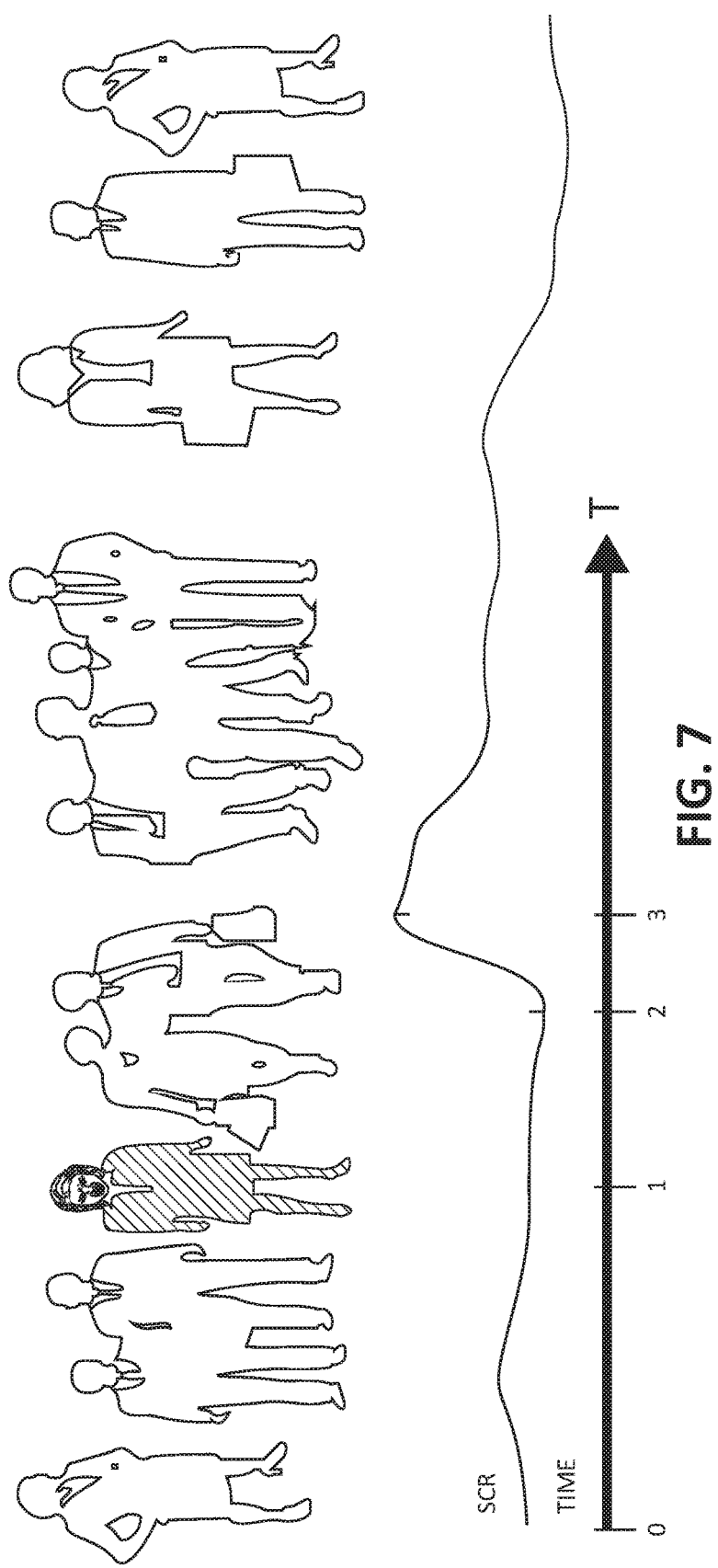
FIG. 7 is a graphical representation of the response of the trainee to an exposure of a stimulus during real-time, according to one embodiment of the present invention.

FIG. 7 is a graphical representation of the skin conductance response of the trainee to an exposure of a stimulus during real-time. At t=0, the trainee views images or objects that are not represented in the conditioned stimuli images and biological response data is collected. At t=1, the trainee notices the image or real-life object represented in one of the conditioned stimuli images. A biological response to the exposure begins at t=2. In particular, onset latency occurs between t=1 to t=2, where onset occurs. At t=3, the biological response reaches a peak amplitude and then drops after t=3. The real-time biological response data, which is detected by analysis and detection module 38, is compared to the trainee's baseline data or historical biological response record. If the real-time biological response data is substantially similar to the trainee's historical biological response record, analysis and detection module 38 classifies the response as an object recognition event. In an embodiment, if the real-time biological response data appears similar to biological response data linked to a desired trainee response, trainee recognition of the object previously associated with that desired trainee response is detected. Subsequently, analysis and detection module 38 sends an alert to the administrator or to another individual proximate the trainee. It will be appreciated that other types of response data are collected in other embodiments.

Figure 8:
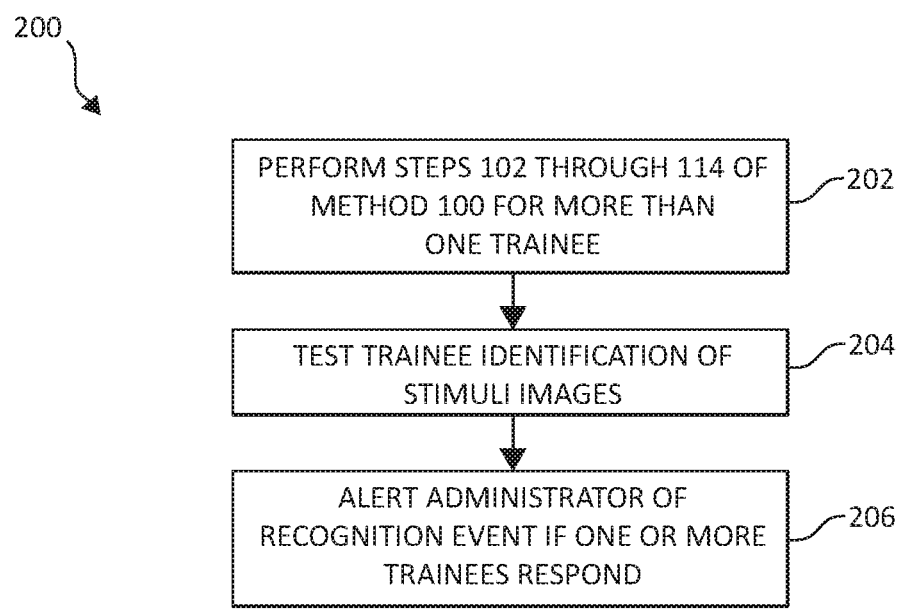
FIG. 8 is a flow diagram of a method of operating the system of FIG. 1 including more than one client site, according to one embodiment of the present invention.

According to an embodiment, more than one trainee is conditioned to react to the conditioned stimuli images. FIG. 8 is a flow diagram of a method 200 of operating network 10 including more than one client site 14 and one or more sensors, each of which is attached to a trainee, in accordance with an embodiment. First, 102, 104, 106, 108, 110, 112, and 114 of method 100 are performed for each individual trainee at 202. Specifically, the administrator prepares one or more stimuli images at 102 and selects non-stimuli images at 104 for each individual trainee. Customized training and detection applications are prepared for each trainee at 106, and each trainee is attached to a sensor or other device for detecting biological response at a client site at 108. The stimuli and non-stimuli images are presented to each trainee for durations that are below conscious awareness at 110. Biological response data is collected for each trainee at 112, and the results of the biological response data are processed and analyzed at 114. In an embodiment, the processed and analyzed response data yields historical biological data records individualized for each trainee and the historical biological data records, the results from the processing and analysis, biological response data and other data are stored in individual trainee files in trainee database 33.

Trainee identification of conditioned stimuli images is then tested at 204. Specifically, one or more of the trainees are exposed to one or more of the conditioned stimuli images or a real-life object that is depicted in the conditioned stimuli images. In an embodiment, testing occurs as a controlled event, and the administrator selects one or more trainees to expose. For example, the administrator may provide input to main operator site 12 to instruct a selected or a random client site 14 to display one or more of the conditioned stimuli images. In another embodiment, the administrator may instruct a person whose likeness is represented by one of the conditioned stimuli images or a person carrying an object having a likeness represented by one of the conditioned stimuli images to come into view of one or more of the selected trainees.

In another example, testing is a random event and not controlled by the administrator. In such case, the person or object having a likeness to one of the conditioned stimuli images randomly appears in the view of one or more of the trainees. The trainees are not pre-selected and may or may not see the person or object.

When biological response data from one or more of the trainees is substantially similar to the corresponding trainee's historical biological response record, the administrator is alerted at 206 as to the occurrence of a recognition event. Specifically, analysis and detection module 38 synthesizes real-time biological response data collected at all of client sites 14 and determines whether one or more of client sites 14 detects biological responses from trainees at the respective client sites 14. If a biological response is detected, analysis and detection module 38 compares the biological response data to historical biological response records previously established for the trainee. If the biological response data is substantially similar to historical biological response record collected during training, analysis and detection module 38 provides an alert to the administrator indicating the recognition event.

In another embodiment, the administrator is alerted to a recognition event only if the biological response data of more than one other trainee is substantially similar to biological response data corresponding to the trainee. For example, analysis and detection module 38 monitors the biological response data of all of the trainees, and the biological response data for each of the other trainees are compared to biological response data previously detected for the trainee. If so, analysis and detection module 38 provides an alert to the administrator.

The alert is a visual, audible or other sensory indication. In an example, analysis and detection module 38 is operable with display 28 of main operator site 12 to display a sign, message, blinking lights, or other visual notification or to play a sound or verbal indication. In another example, main operator site 12 further includes an alert device (not shown) and analysis and detection module 38 is operable with the alert device, which may be a light or other visual device, to blink or change in appearance. Alternatively, the alert device is a loudspeaker or noisemaker which analysis and detection module 38 to which instruction is provided to make a noise. In still another example, the alert is implemented as a tactile or olfactory indication.

Innovative systems and methods have now been described that allow trainee learning of new information and later recognition of the learned information without the conscious attention and awareness of the trainee. By employing priming techniques that occur without the trainee's conscious awareness, the trainee becomes familiar with a stimulus and recognizes the stimulus through unconscious biological response. The above-described training and recognition systems and methods employ little to no attentional demand and do not interfere with other non-training tasks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, infrared, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made through an external computer (for example, through the Internet using an Internet Service Provider).

The flowchart and block diagram in the above figures illustrate the architecture, functionality, and operation of possible implementations of systems, methods and computer program products according to various embodiments of the present invention. In this regard, each block in the flowcharts and block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention has been described with respect to particular embodiments, such embodiments are for illustrative purposes only and should not be considered to limit the invention. Various alternatives and changes will be apparent to those of ordinary skill in the art upon reading this application.

What is claimed is:

1. A method of conditioning a trainee to identify an object and monitoring the trainee to determine when the trainee subconsciously identifies the object previously associated with a conditioned trainee response, the method comprising:
   using a processor to select a visceral response-evoking image for evoking the conditioned trainee response, wherein the conditioned trainee response is particular to correspond with the object, and the visceral response-evoking image is particular from a database storing available visceral response-evoking images;
   attaching at least one sensor to the trainee for detecting trainee biological responses;
   providing instructions to an electronic device to display a stimulus image depicting the object, wherein the instructions to display the stimulus image are to display the stimulus image within view of the trainee for a first duration that is below conscious awareness of the trainee, and the trainee does not initially associate the conditioned trainee response with the object;

providing instructions to the electronic device to display the visceral response-evoking image within view of the trainee after the display of the stimulus image and to display the visceral response-evoking image for a second duration that is below conscious awareness of the trainee in an attempt to link the conditioned trainee response to the object in a mind of the trainee in a manner characterized by an absence of conscious awareness of the link by the trainee;

receiving biological response data of the trainee from the at least one sensor while the trainee is performing a task;

comparing the biological response data of the trainee to biological responses linked to ones of a plurality of trainee responses, the plurality of trainee responses including the conditioned trainee response; and detecting trainee recognition of the object previously associated with the conditioned trainee response based, in part, on the biological response data being linked to the conditioned trainee response included with the plurality of trainee responses;

wherein the conditioned trainee response is below the conscious awareness of the trainee, and providing instructions to display the stimulus image and providing instructions to display the visceral response-evoking image after the display of the stimulus image are repeated at least until the conditioned trainee response is linked to the object in the mind of the trainee.

2. The method of claim 1, wherein the object is a person and the stimulus image includes a facial image of the person.

3. The method of claim 2, wherein the task is substantively unrelated to the identification of the person.

4. The method of claim 1, wherein the visceral response-evoking image includes an attacking animal.

5. The method of claim 1, further comprising providing instructions to run a computer application operable to display a series of images simultaneously with displaying the stimulus image and the visceral response-evoking image, the series of images displayed for a duration allowing for conscious awareness by the trainee.

6. The method of claim 5, wherein the series of images relate to the task being performed by the trainee that is unrelated to identification of the object and is unrelated to linking the conditioned trainee response to the object.

7. The method of claim 1, further comprising using the biological response data of the trainee to determine a baseline biological reading for the conditioned trainee response.

8. The method of claim 1, wherein the trainee is not consciously aware of the object even after the conditioned trainee response is linked to the object.

9. The method of claim 1, wherein comparing the biological response data and detecting trainee recognition are each performed in real time with receiving the biological response data of the trainee.

10. The method of claim 1, wherein providing instructions to display each of the stimulus image and visceral response-evoking image includes providing instructions to display the stimulus image and the visceral response-evoking image within one second of one another to encourage the association between the conditioned trainee response and the object to develop in the mind of the trainee.

11. The method of claim 1, further comprising:
if trainee recognition of the object is detected based on the biological response data being linked to the conditioned trainee response in accordance with historical data received during creation of the association between the conditioned trainee response and the object, providing an indication to alert one or more of the trainee and individuals proximate the trainee of the trainee recognition of the object and possible presence of the object proximate to the trainee where the presence of the object proximate to the trainee was not previously known to the trainee or to the individual proximate to the trainee.

12. The method of claim 11, wherein providing the indication to alert includes alerting a main operator site remote from a client operation site, and the trainee is located at the client operation site.

13. The method of claim 1, wherein:
receiving biological response data includes receiving biological response data from more than one trainee who has been conditioned to associate the object with the conditioned trainee response by viewing one or more stimuli images followed by one or more visceral response-evoking images, one of the one or more stimuli images depicting the object, and each of the stimuli images and the visceral response-evoking images having been presented for a duration below conscious awareness of the more than one trainee.

14. The method of claim 1, further comprising:
creating a historical biological response record of a specific trainee based on the received biological response data of the specific trainee; and
comparing real-time biological response data of the specific trainee resulting from viewing the object to the historical biological response of the specific trainee.

15. The method of claim 14, wherein:
the historical biological response record includes the conditioned trainee response observed when the trainee views of a stimuli image corresponding with the object, and
comparing real-time biological response data results in detecting trainee recognition of the object when the real-time biological response data matches the conditioned trainee response from the historical biological response record.

16. The method of claim 1, wherein the trainee does not consciously identify the object while having the conditioned trainee response.

17. The method of claim 1, wherein:
the biological response data includes a galvanic skin response.

18. The method of claim 1, wherein:
the biological response data includes heart rate data.

19. The method of claim 1, wherein:
the biological response data includes brain activity data.

* * * * *